(12) United States Patent
Marupaduga

(10) Patent No.: US 11,317,457 B1
(45) Date of Patent: Apr. 26, 2022

(54) USE OF SECONDARY-NODE LOADING AS BASIS TO CONTROL TIMING FOR CONFIGURING DUAL CONNECTIVITY

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 142 days.

(21) Appl. No.: 16/842,492

(22) Filed: Apr. 7, 2020

(51) Int. Cl.
*H04W 76/15* (2018.01)
*H04W 48/06* (2009.01)
*H04W 36/38* (2009.01)
*H04W 76/10* (2018.01)

(52) U.S. Cl.
CPC ......... *H04W 76/15* (2018.02); *H04W 36/385* (2013.01); *H04W 48/06* (2013.01); *H04W 76/10* (2018.02)

(58) Field of Classification Search
CPC ... H04W 36/385; H04W 76/10; H04W 76/15; H04W 76/16; H04W 48/02; H04W 48/06; H04W 48/10; H04W 48/16; H04W 48/17; H04W 48/18
See application file for complete search history.

(56) References Cited

U.S. PATENT DOCUMENTS

| 8,213,361 | B1 | 7/2012 | Sarkar et al. | |
|---|---|---|---|---|
| 10,681,601 | B2 * | 6/2020 | Miao | H04W 36/38 |
| 10,716,158 | B1 * | 7/2020 | Pawar | H04L 5/0058 |
| 10,827,551 | B1 * | 11/2020 | Marupaduga | H04W 28/0226 |
| 11,051,312 | B1 * | 6/2021 | Marupaduga | H04W 72/0453 |
| 2018/0324663 | A1 * | 11/2018 | Park | H04W 36/0069 |
| 2020/0092210 | A1 * | 3/2020 | Thanneeru | H04W 28/0247 |

FOREIGN PATENT DOCUMENTS

| EP | 3051876 A4 * | 8/2016 | ......... H04W 84/045 |
|---|---|---|---|
| WO | WO 2019/170209 | 9/2019 | |

* cited by examiner

*Primary Examiner* — Magdi Elhag

(57) ABSTRACT

A mechanism for controlling configuration of dual connectivity for a UE that has a first connection with a first access node. The first access node could make a determination whether a level of load of a second access node with which the UE is not currently connected is threshold high. And if the determination is that the determined level of load of the second access node is not at least threshold high, then the first access node could proceed with application of a process for adding the second connection, without applying a timer for delaying application of the process. Whereas, if the determination is that the determined level of load of the second access node is at least predefined threshold high, then the first access node could apply the timer for delaying application of the process and, upon expiration of the timer, could proceed with application of the process.

20 Claims, 3 Drawing Sheets

A FIRST ACCESS NODE, WITH WHICH A UE HAS A FIRST CONNECTION, DETERMINES A LEVEL OF LOAD OF A SECOND ACCESS NODE WITH WHICH THE UE IS NOT CURRENTLY CONNECTED — 38

THE FIRST ACCESS NODE USES THE DETERMINED LEVEL OF LOAD OF THE SECOND ACCESS NODE AS A BASIS TO CONTROL WHETHER TO DELAY CONFIGURATION OF DUAL CONNECTIVITY FOR THE UE IN WHICH THE UE WOULD BE SERVED CONCURRENTLY BY THE FIRST ACCESS NODE OVER THE FIRST CONNECTION BETWEEN THE UE AND THE FIRST ACCESS NODE AND BY THE SECOND ACCESS NODE OVER A SECOND CONNECTION BETWEEN THE UE AND THE SECOND ACCESS NODE — 40

USE OF SECONDARY-NODE LOADING AS BASIS TO CONTROL TIMING FOR CONFIGURING DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including resources for carrying information between the access nodes and UEs. Without limitation, for example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs, and the UE could responsively transmit the data to the access node in those PRBs.

In practice, the UE could also regularly evaluate the quality (e.g., based on reference-strength strength) of its coverage from its serving access node and could transmit an associated channel quality indicator (QCI), which the access node could use as a basis to set a modulation and coding scheme (MCS) to be used for air-interface communication between the access node and the UE. Higher quality coverage could correspond with a higher-order MCS, which could allow use of fewer air-interface resources (e.g., PRBs) to communicate given bearer data, whereas lower quality coverage could correspond with a lower-order MCS, which could require use of more air-interface resources to communicate given bearer data.

Further, for both the downlink and uplink air-interface communication, if the receiving end does not successfully receive a scheduled data communication from the transmitting end (which might happen if coverage conditions are relatively poor), the receiving end could responsively send to the transmitting end a negative acknowledgement (NACK), and the transmitting end could then responsively engage in re-transmission using air-interface resources of an upcoming subframe.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity (or non-standalone connectivity) could encompass connectivity on two or more RATs concurrently, to facilitate technology transitions or for other purposes. Dual connectivity can thus be distinguished from single connectivity (or standalone connectivity), where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

These access nodes could be collocated in a common cell site, possibly sharing an antenna tower, and could be configured to provide coverage in generally the same direction as each other. Alternatively, the access nodes could be at separate cell sites but could still configured to provide substantially overlapping coverage.

When the UE enters into coverage of such a system, the UE could initially scan for coverage under the first RAT and discover threshold strong coverage of the MN, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT standalone mode (i.e., under just the first RAT) with packet-data communications as described above. For instance, when the core network has data to send to the UE, the data could flow to the MN, and the MN could schedule and provide transmission of the data on downlink PRBs to the UE, with the UE monitoring for scheduling directives and reading the data from the downlink PRBs. And when the UE has data to send, the UE could transmit a scheduling directive to the MN, the MN could schedule transmission of the data on uplink PRBs from the UE, and the UE could monitor for scheduling directives and transmit the data on the scheduled uplink PRBs.

In addition, once the UE is connected with the MN and is attached with the core network, the MN could engage in a process to coordinate setup of dual connectivity for the UE, so that the UE can be served concurrently by the MN and the SN.

To do so, the MN could first transmit to the UE a "B1" (inter-RAT) measurement object that would cause the UE to scan for coverage of the SN under the second RAT and to report to the MN if and when the UE detects at threshold strong coverage of the SN. And when the MN receives from the UE a measurement report indicating that the UE is in threshold strong coverage of the SN, the MN could then engage in an SN-addition process to add for the UE a second-RAT connection with the SN, so that the MN and SN can then cooperatively provide the UE with dual-connectivity service over their respective connections with the UE.

In an example SN-addition process, for instance, the MN could transmit to the SN an SN-addition request message, providing RRC and DRB configuration information and other information for the second-RAT connection, and the SN could then responsively allocate resources for the second-RAT connection and reply to the MN with an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN. Alternatively or additionally, the MN could otherwise engage in processing to configure or trigger configuration of a split bearer for the UE.

With dual connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data to the MN, which the MN could transmit to the UE over the UE's first-RAT connection. Likewise, when the UE has data to transmit, the ULE could transmit a portion of the data over the UE's first-RAT connection to the MN, which the MN could forward to the SN and the SN could transmit over the UE's access bearer to the gateway system, and the UE could transmit another portion of the data over the UE's second-RAT connection to the SN, which the SN could transmit over the UE's access bearer to the gateway system.

While the above process of configuring dual connectivity for a UE may work well practice, one technical issue with the process could be that the SN may be heavily loaded at the time the MN engages in the SN-addition process with the SN. For instance, the SN may be serving a great many connected UEs and/or may have threshold high PRB utilization (e.g., great percentage of PRBs allocated per unit time). If the SN is heavily loaded, then the SN may have limited capacity to serve the UE, so the UE may receive low-throughput service from the SN. Further, if the SN is heavily loaded, then adding service of the UE to the SN's load could limit the SN's capacity to serve other UEs.

The present disclosure provides a mechanism to help address this technical issue.

In accordance with the disclosure, once a UE connects with an MN and is attached, the MN will dynamically delay the SN-addition process for the UE, based on a consideration of the level of load of the SN. For instance, the MN could determine that the SN is threshold heavily loaded, and in response to determining that the SN is threshold heavily loaded, (i) the MN could responsively apply a delay timer to delay transmitting to the UE the B1 measurement object that directs the UE to scan for coverage of the SN, and/or (ii) the MN could responsively apply a delay timer to delay start of the SN-addition process upon receipt of the UE's B1 measurement report indicating that the UE is within threshold strong coverage of the SN. Further, the MN could dynamically set the length of such a delay timer based on how loaded the SN is, with the timer duration being proportional to the SN load.

Delaying the SN-addition process for the UE based on the SN being threshold heavily loaded may help in practice, as there is at least a chance that the load of the SN may decrease by the end of the delay period. On the other hand, proceeding with the SN-addition process without delay if the SN is not threshold heavily loaded could help facilitate quick SN addition and dual-connectivity service of the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
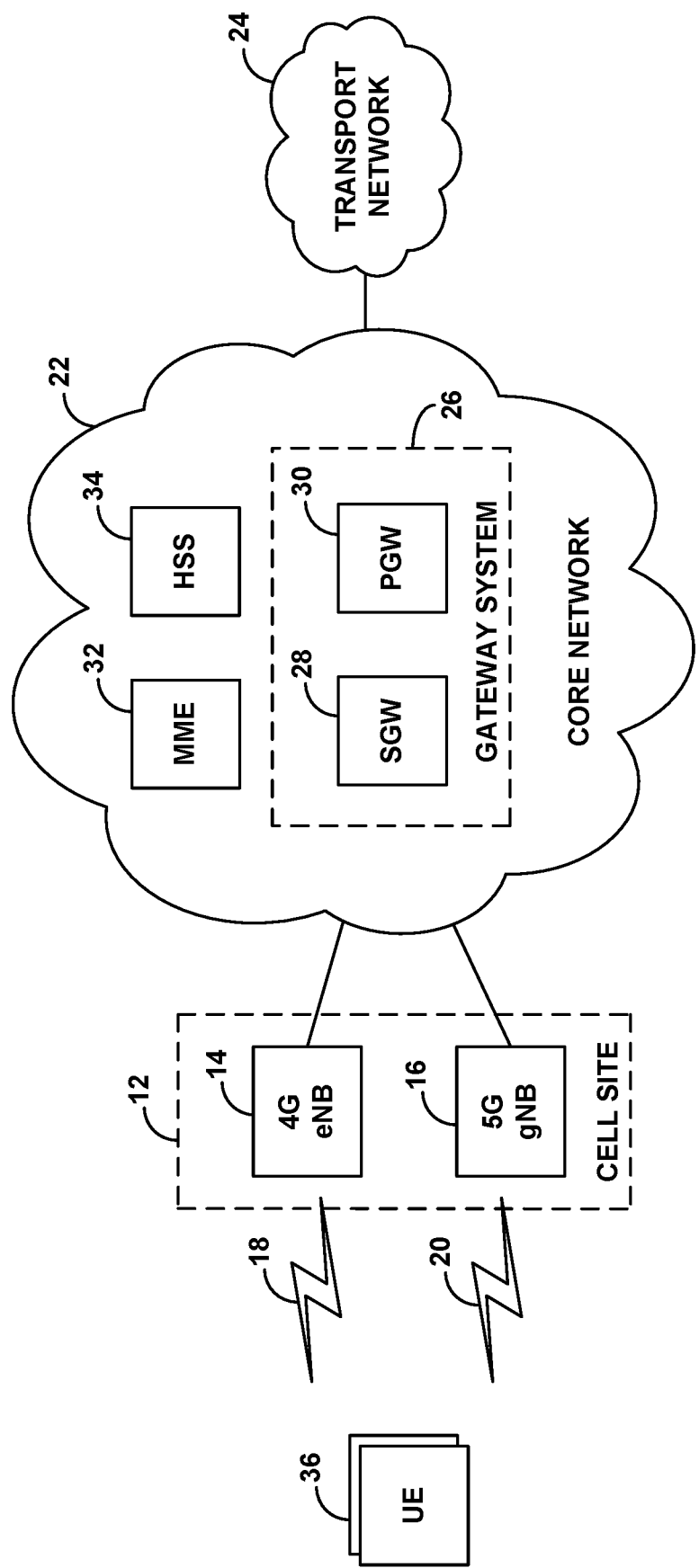
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective antenna structure that is configured to transmit and receive electromagnetic signals in a region defined by an antenna pattern or radiation pattern. The antenna pattern defines a scope of coverage in which the access node can engage in downlink transmission to UEs and receive uplink transmission from UEs. In particular, the antenna pattern may define a main lobe and could be characterized by an azimuth angle, an elevation angle, and a beamwidth. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), and the beamwidth defines an angular width of the main lobe within the horizontal plane, typically measured between half-power (−3 dB) points of the main lobe for instance.

In practice, the antenna structures of the access nodes could be collocated with each other, such as by being mounted on a common antenna tower and/or being in a common housing. Further, the azimuth angle, elevation angle, and beamwidth of either or each access node's antenna pattern could be structured so that the two access nodes provide coverage of the same or similar direction and scope as each other, i.e., largely coterminous coverage, even though the access nodes may be operating on different frequencies with different path loss than each other. There could also be some variation between the access nodes' respective coverage areas.

Each access node could provide coverage on one or more carriers according to a respective radio access technology. For instance, the 4G eNB 14 could provide 4G LTE coverage 18 on one or more 4G carriers, and the 5G eNB 16 could provide 5G NR coverage 20 on one or more 5G carriers.

In an example implementation, the respective coverage on each carrier could be divided over time into frames, subframes, timeslots, and symbol segments, and could be divided over carrier frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes as further discussed above.

The 4G air interface and 4G service provided by 4G eNB 14 could differ from the 5G air interface and 5G service provided by the 5G gNB 16 in various ways now known or later developed. For example, one may provide variable subcarrier spacing, and the other may provide fixed subcarrier spacing. As another example, one may have different symbol time segments and/or different subcarrier spacing than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26 having a serving gateway (SGW) 28 and a packet-data network gateway (PGW) 30, which provides user-plane connectivity with the transport network 24. Further, the core network includes a mobility management entity (MME) 32, which serves as a core-network controller. And the core network includes a home subscriber server (HSS) 34, which stores UE profile records specifying service-subscription plans, UE configurations, and/or other such UE capability information. Other core-network arrangements are also possible.

FIG. 1 also illustrates one or more example UEs 36 within coverage of 4G eNB 14 and 5G gNB 16. Each of these UEs could take any of the forms noted above, among other possibilities. Further, some or all of the UEs could be equipped with a 4G LTE radio, a 5G NR radio, and associated circuitry and logic, and could have associated subscription plans, enabling the UEs to engage in 4G LTE service, 5G NR service, and EN-DC service. And some of the UEs might be equipped with just a 4G LTE radio and associated circuitry and logic that enables the UEs to engage in 4G LTE service, or just a 5G LTE radio and associated circuitry and logic that enables the UEs to engage in just 5G NR service.

In line with the discussion above, when a 4G-capable UE initially enters into coverage of this network, the UE could discover coverage of the 4G eNB 14, such as by scanning predefined 4G carriers to find a synchronization signal from the 4G eNB 14 and then determining that a reference signal from the 4G eNB 14 is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE of at least one user-plane bearer. For instance, the MME 32 could engage in signaling with the 4G eNB 14 and the SGW 28 to coordinate setup for the UE of an S1-U packet tunnel between the 4G eNB 14 and the SGW 28, and the SGW 28 could responsively engage in signaling with the PGW 30 to coordinate setup for the UE of an associated S5 packet tunnel between the SGW 28 and the PGW 30. Further, the 4G eNB 14 could engage in signaling with the UE to establish a DRB and other configuration parameters associated with a 4G connection for the UE.

As a last step of this attachment process, the 4G eNB 14 could also transmit to the UE an RRC message carrying a UE-capability enquiry, and the UE could respond to the 4G eNB 14 with a "UE capability information" information element (IE), which could indicate whether the UE is EN-DC capable. Alternatively, the 4G eNB 14 could receive such capability information from the MME 32, which could obtain the information from the HSS 34. The 4G eNB 14 could then store this UE capability data in a context record for reference while serving the UE.

If the UE is EN-DC capable, the 4G eNB 14 could then work to configure EN-DC service for the UE as noted above.

In line with the discussion above, for instance, the 4G eNB 14, operating as MeNB, could first transmit to the UE (e.g., in an RRC message) a B1 (inter-RAT) measurement object that directs the UE to scan for coverage of the 5G gNB 16, e.g., on one or more carriers on which the 5G gNB 16 operates, and that designates at least one B1 measurement threshold. The B1 measurement threshold could be a minimum threshold level of reference signal receive power (RSRP) and/or reference signal receive quality (RSRQ) that the UE has from the 5G gNB 16 as a condition for the UE providing a B1 measurement report to the 4G eNB 14. For instance, the B1 measurement threshold could be RSRP on the order of at least −116 dBm to −95 dBm.

Upon receipt from the UE of a B1 measurement report indicating that the UE is within threshold strong enough coverage of the 5G gNB 16, the 4G eNB 14 could then engage in process to add the 5G gNB 16 as an SgNB for the UE, such as by transmitting to the 5G gNB 16 an SgNB-Addition request to cause the 5G gNB to allocate resources for a 5G connection for the UE on one or more 5G carriers, receiving an SgNB-Addition-Request acknowledge message from the 5G gNB 16, and engaging in associated RRC signaling with the UE, in response to which the UE could then access and complete establishment of the 5G connection. Further, the 4G eNB 14 could engage in signaling as described above to transfer to the UE's access bearer to the 5G gNB as well and/or to configure or trigger configuration of a split bearer for the UE.

The 4G eNB 14 and 5G gNB 16 could then provide the UE with EN-DC service, concurrently serving the UE over their respective connections with the UE. Namely, the 4G eNB 14 could allocate PRBs of its 4G air interface as needed to carry data over the 4G connection between the 4G eNB 14 and the UE, and the 5G gNB could allocate PRBs of its 5G air interface as needed to carry data over the 5G connection between the 5G gNB 16 and the UE.

In addition to the 4G eNB 14 and 5G gNB 16 thus providing this example UE with EN-DC service, the 4G eNB 14 and 5G gNB 16 might also concurrently serve one or more other UEs with EN-DC service, the 4G eNB 14 might also concurrently serve one or more other UEs with standalone 4G service (e.g., where UEs connect with just the 4G eNB 14 possibly in the manner discussed above), and the 5G gNB 16 might also concurrently serve one or more other UEs with standalone 5G service (e.g., where UEs connect with just the 5G gNB 16 possibly in the manner discussed above).

As a result, the 5G gNB 16 may have a varying level of load representing how busy or occupied the 5G gNB 16 is with respect to providing service. For present purposes, this level of load could relate to a level of congestion of one or more carriers on which the 5G gNB 16 may end up serving UE, which might be a single carrier on which the 5G gNB 16 operates and/or might be multiple carriers on which the 5G gNB 16 operates. And the level of load could be measured by various metrics, examples of which could include the quantity of UEs connected with the 5G gNB, level of PRB utilization (on the downlink and/or uplink), such as percentage of PRBs allocated on the air interface on average over a recent sliding window of time or the like, and control channel load, such as percentage of control channel resource elements occupied with signaling on average over a recent sliding window of time or the like, among other possibilities.

In accordance with the present disclosure, as noted above, the 4G eNB 14 could dynamically delay the SgNB-addition process for the UE, based at least on the current load level of the 5G gNB 16. For instance, responsive to the 5G gNB 16 being threshold heavily loaded, the 4G eNB 14 could delay the 4G eNB's transmission to the UE of a B1 measurement object triggering UE scanning for coverage of the 5G gNB (which would by definition delay the SgNB-addition process that may occur upon receipt of the UE's associated B1 measurement report) and/or the 4G eNB 14 could delay the start of the SgNB-addition process upon receipt of the UE's associated B1 measurement report.

To facilitate, the 5G gNB 16 could periodically or otherwise report to the 4G eNB 14 the 5G gNB's current load level, through signaling over an inter-access-node interface such as an X2 interface for instance, or the 4G eNB 14 could otherwise determine the level of load of the 5G gNB (e.g., by querying an element management system (EMS) or the like that tracks such information). And the 4G eNB 14 could store a record of the most recent load level of the 5G gNB 16.

In normal operation, when an EN-DC-capable UE connects with the 4G eNB 14 and is attached, the 4G eNB 14 could programmatically respond by sending to the UE a B1 measurement object to trigger the UE scanning for and reporting coverage of the 5G gNB 16. The normal timing of sending the B1 measurement object could be right after the UE connects and is attached (subject to any other intervening processing steps), without application of a delay timer for delaying transmission of that B1 measurement object to the UE.

With the present advance, however, once the UE connects with the 4G eNB 14 and is attached, the 4G eNB 14 could intentionally delay its transmission of the B1 measurement object to the UE in response to the 4G eNB 14 determining that the 5G gNB 16 is threshold heavily loaded.

In particular, the 4G eNB 14 could determine a current level of load of the 5G gNB 16 and could determine if that level of load is at least predefined threshold high. If the 4G eNB 14 determines that the current level of load of the 5G gNB 16 is not at least predefined threshold high, then the 4G eNB 14 could proceed as normal to transmit to the UE a B1 measurement object that will cause the UE to scan for threshold strong coverage of the 5G gNB 16, without applying a delay timer for delaying transmission of the B1 measurement object. Whereas, if the 4G eNB 14 determines that the current level of load of the 5G gNB 16 is at least predefined threshold high, then the 4G eNB 14 could instead apply a delay timer for delaying transmission of the B1 measurement object and, upon expiration of the delay timer, could then transmit to the UE a B1 measurement object that will cause the UE to scan for threshold strong coverage of the 5G gNB 16.

The 4G eNB 14 could determine the current level of load of the 5G gNB 16 as a most recently determined level of load, such as a level of load most recently reported by the 5G gNB 16. Alternatively, the 4G eNB 14 might determine the current level of load of the 5G gNB 16 as a prediction for the current time of day based on historical data of levels of load of the 5G gNB 16 at about the same time of day on past days or the like. Still alternatively, the 4G eNB 14 might query the 5G gNB 16 in real time to determine a latest level of load of the 5G gNB 16.

If the 5G gNB 16 operates on a single carrier, then the load at issue here could be load on that single carrier. Whereas, if the 5G gNB 16 operates on multiple carriers, then the load at issue here could be load on some or all of those carriers, such as on whichever carrier(s) the 5G eNB 14 would specify in its B1 measurement object to the UE. In practice, if the 5G gNB 16 has at least one carrier that is not threshold heavily loaded, the 4G eNB 14 might proceed right away with transmission of the B1 measurement as to that carrier, without application of a delay timer. But if the 5G gNB 16 is threshold heavily loaded on each carrier that the 4G eNB 14 would include in the B1 measurement object, then the 4G eNB 14 may apply the delay timer.

Further, the level of load of the 5G gNB 16 could also be a level of load based on one or more of the metrics noted above, among other possibilities. And the level of load that is deemed to be threshold high, so as to trigger intentional delaying of transmission of the B1 measurement object, could be predefined by engineering design or other means to be a level that is deemed high enough to pose an issue. Without limitation, for instance, threshold high PRB utilization might be a percentage in the range of 75% to 100%.

Still further, as noted above, the 4G eNB 14 could set the duration of the delay period based on how threshold-heavily loaded the 5G gNB 16 is. For instance, the 4G eNB 14 could be provisioned to consider two or more high-load thresholds, such as 75% PRB utilization and 90% PRB utilization. If the 4G eNB 14 determines that the current load of the 5G gNB 16 is at least the first of those thresholds (e.g., at least 75% PRB utilization) but not as high as the second of those thresholds (e.g., at least 90% PRB utilization), then, based at least on that determination, the 4G eNB 14 could apply a delay timer set to a first delay period, such as 30 seconds for instance. Whereas if the 4G eNB 14 determines that the current load of the 5G gNB 16 is at least as high as the second threshold, then, based at least on that determination, the 4G eNB 14 could apply a delay timer set to a second delay period, such as 60 seconds for instance.

As also discussed above, the 4G eNB 14 could additionally or alternatively use load of the 5G gNB 16 as a basis to delay the SgNB-addition process upon receipt from the UE of a B1 measurement report indicating that the UE is within threshold strong coverage of the 5G gNB 16.

In normal operation, for instance, once the 4G eNB 14 receives from a UE a B1 measurement report indicating that the UE is within threshold strong coverage of the 5G gNB 16, the 4G eNB 14 could proceed with the SgNB-addition process as described above. And the normal timing of starting the SgNB-addition process could be right after the 4G eNB 14 receives the UE's B1 measurement report (subject to any other intervening processing steps), without application of a delay timer for delaying start of the SgNB-addition process.

With the present advance, however, once the 4G eNB 14 receives the UE's B1 measurement report indicating that the UE is within threshold strong coverage of the 5G gNB 16, the 4G eNB 14 could intentionally delay start of the SgNB-addition process for adding for the UE a secondary 5G connection with the 5G gNB 16, in response to the 4G eNB 14 determining that the 5G gNB 16 is threshold heavily loaded.

In particular, as discussed above, the 4G eNB 14 could determine a current level of load of the 5G gNB 16 and could determine if that level of load is at least predefined threshold high. If the 4G eNB 14 determines that the current level of load of the 5G gNB 16 is not at least predefined threshold high, then the 4G eNB 14 could proceed as normal with the SgNB-addition process for adding for the UE a secondary connection with the 5G gNB 16, without applying a delay timer for delaying start of that SgNB-addition process. Whereas, if the 4G eNB 14 determines that the current level of load of the 5G gNB 16 is at least predefined threshold high, then the 4G eNB 14 could instead apply a delay timer for delaying start of that SgNB-addition process and, upon expiration of the delay timer, could then start the SgNB-addition process.

Note also that in some dual-connectivity implementations, an MN (e.g., 4G eNB 14) might be configured to engage in "blind" SN-addition for a UE without having the UE scan for and report being within threshold strong coverage of the SN (e.g., 5G gNB 16). In such an implementation, the MN might normally proceed with the SN-addition process to add for the UE a second-RAT connection with a given SN (e.g., one that provides coverage largely coterminous with the MN's coverage and is therefore likely to cover the UE) right away after the UE connects with the MN under the first RAT and is attached. But with the present advance, the MN could instead delay that SN-addition process in the manner discussed above, in response to determining that the SN is threshold heavily loaded.

Figure 2:
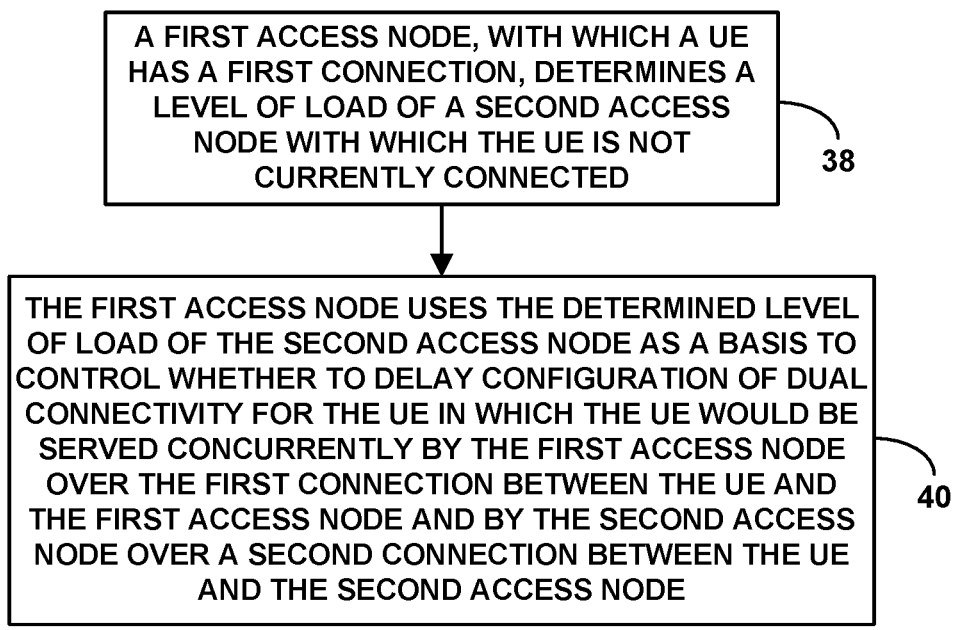
FIG. 2 is a flow chart depicting an example method in accordance with the disclosure.

FIG. 2 is a flow chart depicting an example method that can be carried out to control configuration of connectivity for a UE.

As shown in FIG. 2, at block 38, the method includes a first access node, with which the UE has a first connection, determining a level of load of a second access node with which the UE is not currently connected. And at block 40, the method then includes the first access node using the determined level of load of the second access node as a basis to control whether to delay configuration of dual connectivity for the UE in which the UE would be served concurrently by the first access node over the first connection between the UE and the first access node and by the second access node over a second connection between the UE and the second access node.

In line with the discussion above, the act of the first access node using the determined level of load of the second access node as a basis to control whether to delay configuration of the dual connectivity for the UE could involve the first access node making a determination whether the determined level of load of the second access node is at least predefined threshold high and then controlling operation based on the determination. In particular, if the determination is that the determined level of load of the second access node is not at least predefined threshold high, then, based at least in part on the determination, the first access node could proceed with application of a process for adding the second connection, without the first access node applying a timer for delaying application of the process. Whereas if the determination is that the determined level of load of the second access node is at least predefined threshold high, then, based at least in part on the determination, the first access node could apply the timer for delaying application of the process and, upon expiration of the timer, could then proceed with application of the process.

As further discussed above, this method could be carried out upon establishment of the first connection and attachment of the UE. For instance, once an RRC connection is established between the first access node and the UE and the UE is attached for service on the core network (whether the UE attaches after the connection or had previously attached), the method could then be carried out.

In addition, as discussed above, this method could be carried out in a scenario where the first connection is according to a first RAT (e.g., 4G LTE) and the second connection is according to a second RAT (e.g., 5G NR), and where the dual connectivity is EN-DC. Alternatively, the method might be carried out in another form of dual-connectivity, perhaps with multiple connections according to the same RAT as each other.

Further, as discussed above, the act of determining the level of load of the second access node could involve receiving from the second access node, over an inter-access-node interface a report of the level of load. Alternatively or additionally, the act of determining the level of load of the second access node could involve predicting the level of load based on historical data.

As also discussed above, the process for adding the second connection could involve transmitting from the first access node to the UE a directive (e.g., including a B1 measurement object) for the UE to scan for coverage of the second access node, and the act of applying the timer for delaying application of the process could involve applying a timer for delaying transmission from the first access node to the UE the directive for the UE to scan for coverage of the second access node. Alternatively or additionally, the process for adding the second connection comprises engaging by the first access node in signaling with the second access node to arrange for establishment for the UE of the second connection, and wherein applying the timer for delaying application of the process comprises applying a timer for delaying the engaging in the signaling with the second access node.

Still further, as discussed above, the method could also involve setting a duration for the timer based on determined level of load of the second access node. Moreover, as discussed above, the level of load of the second access node could be based on a metric such as PRB utilization, control channel load, and/or quantity of connected UEs or other devices.

Figure 3:
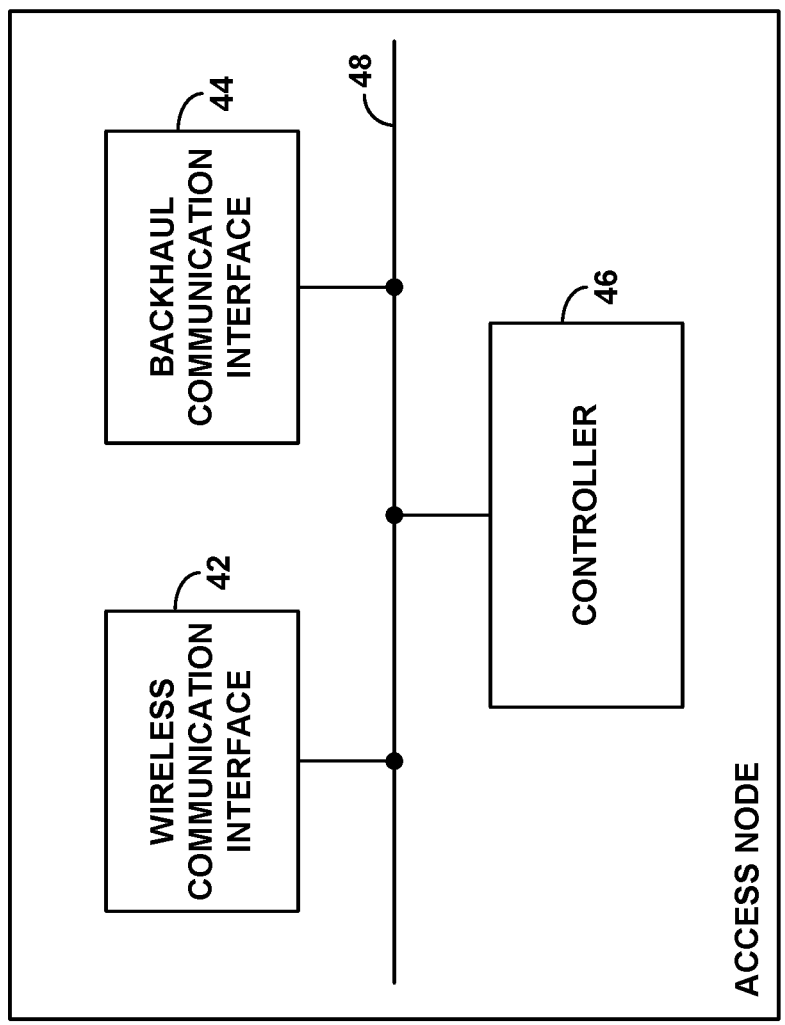
FIG. 3 is a simplified block diagram of an example access node operable in accordance with the disclosure.

FIG. 3 is a simplified block diagram of an example first access node, such as 4G eNB 14, showing some of the components that could be included in the access node in a non-limiting example implementation. As shown, the example first access node includes a wireless communication interface 42, a backhaul communication interface 44, and a controller 46, which could be integrated together in various ways and/or interconnected by a system bus, network, or other communication mechanism 48 as shown.

The wireless communication interface 42 could include a radio and antenna structure through which the first access node could be configured to engage in air-interface communication and serve UEs according to a first RAT. And the backhaul communication interface 44 could comprise a wired or wireless network communication module, such as an Ethernet interface, through which to communicate with other entities, perhaps with the second access node and/or with one or more other entities on or via a core network.

Further, the controller 46 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to cause the first access node to carry out various operations as described herein, Various features discussed above can be implemented in this context as well, and vice versa.

For instance the controller could be configured to control configuration of connectivity of a UE when the UE has a first connection between the UE and the first access node, with the controller being configured to cause the first access node to carry out operations including (i) determining a level of load of a second access node with which the UE is not currently connected, and (ii) using the determined level of load of the second access node as a basis to control whether to delay configuration of dual connectivity for the UE in which the UE would be served concurrently by the first access node over the first connection between the UE and the first access node and by the second access node over a second connection between the UE and the second access node.

The present disclosure also contemplates a non-transitory computer-readable medium having encoded thereon (e.g., storing, embodying, containing, or otherwise incorporating) program instructions executable to cause a processing unit to carry out operations such as those described above.

Exemplary embodiments have been described above. Those skilled in the art will understand, however, that changes and modifications may be made to these embodiments without departing from the true scope and spirit of the invention.

What is claimed is:

1. A method for controlling configuration of connectivity for a user equipment device (UE), the method comprising:
   determining, by a first access node with which the UE currently has a first connection between the UE and the first access node, a level of load of a second access node with which the UE is not currently connected; and
   using, by the first access node, the determined level of load of the second access node as a basis to control whether to delay configuration of dual connectivity for the UE in which the UE would be served concurrently by the first access node over the first connection between the UE and the first access node and by the second access node over a second connection between the UE and the second access node,
   wherein using, by the first access node, the determined level of load of the second access node as a basis to control whether to delay configuration of the dual connectivity for the UE comprises (i) making a determination by the first access node whether the determined level of load of the second access node is at least predefined threshold high, (ii) if the determination is that the determined level of load of the second access node is not at least predefined threshold high, then, based at least in part on the determination, proceeding by the first access node with application of a process for adding the second connection, without applying by the first access node a timer for delaying application of the process, and (iii) if the determination is that the determined level of load of the second access node is at least predefined threshold high, then, based at least in part on the determination, applying by the first access node the timer for delaying application of the process and, upon expiration of the timer, proceeding by the first access node with application of the process.

2. The method of claim 1, wherein the method is carried out upon establishment of the first connection and attachment of the UE.

3. The method of claim 1, wherein the first connection is according to a first radio access technology (RAT) and the second connection is according to a second RAT.

4. The method of claim 3, wherein the first RAT is 4G Long Term Evolution (LTE), wherein the second RAT is 5G New Radio (NR), and wherein the dual connectivity is EURTA-NR Dual Connectivity (EN-DC).

5. The method of claim 1, wherein determining the level of load of the second access node comprises receiving from the second access node, over an inter-access-node interface a report of the level of load.

6. The method of claim 1, wherein determining the level of load of the second access node comprises predicting the level of load based on historical data.

7. The method of claim 1, wherein the process for adding the second connection comprises transmitting from the first access node to the UE a directive for the UE to scan for coverage of the second access node, and wherein applying the timer for delaying application of the process comprises applying a timer for delaying transmission from the first access node to the UE the directive for the UE to scan for coverage of the second access node.

8. The method of claim 7, wherein the first connection is according to a first radio access technology (RAT), wherein the second connection is according to a second RAT, and wherein the directive comprises a B1 object.

9. The method of claim 1, wherein the process for adding the second connection comprises engaging by the first access node in signaling with the second access node to arrange for establishment for the UE of the second connection, and wherein applying the timer for delaying application of the process comprises applying a timer for delaying the engaging in the signaling with the second access node.

10. The method of claim 1, further comprising setting a duration for the timer based on the determined level of load of the second access node.

11. The method of claim 1, wherein the level of load of the second access node comprises a metric selected from the group consisting of physical-resource-block (PRB) utilization, control channel load, and quantity of connected devices.

12. A first access node comprising:
   a wireless communication interface through which the first access node is configured to engage in air-interface communication;
   a backhaul communication interface; and
   a controller configured to control configuration of connectivity of a user equipment device (UE) when the UE has a first connection between the UE and the first access node, wherein the controller is configured to cause the first access node to carry out operations including:
      determining a level of load of a second access node with which the UE is not currently connected, and
      using the determined level of load of the second access node as a basis to control whether to delay configuration of dual connectivity for the UE in which the UE would be served concurrently by the first access node over the first connection between the UE and the first access node and by the second access node over a second connection between the UE and the second access node,
   wherein using the determined level of load of the second access node as a basis to control whether to delay configuration of the dual connectivity for the UE comprises (i) making a determination whether the determined level of load of the second access node is at least predefined threshold high, (ii) if the determination is that the determined level of load of the second access node is not at least predefined threshold high, then, based at least in part on the determination, proceeding with application of a process for adding the second connection, without applying a timer for delaying application of the process, and (iii) if the determination is that the determined level of load of the second access node is at least predefined threshold high, then, based at least in part on the determination, applying the timer for delaying application of the process and, upon expiration of the timer, proceeding with application of the process.

13. The first access node of claim 12, wherein the controller causes the first access node to carry out the operations upon establishment of the first connection and attachment of the UE.

14. The first access node of claim 12, wherein the first connection is according to a first radio access technology (RAT) and the second connection is according to a second RAT.

15. The first access node of claim 12, wherein the process for adding the second connection comprises transmitting from the first access node to the UE a directive for the UE to scan for coverage of the second access node, and wherein applying the timer for delaying application of the process comprises applying a timer for delaying transmission from the first access node to the UE the directive for the UE to scan for coverage of the second access node.

16. The first access node of claim 12, wherein the first connection is according to 4G Long Term Evolution (LTE), the second connection is according to 5G New Radio (NR), and the directive comprises a B1 object.

17. The first access node of claim 12, wherein the process for adding the second connection comprises engaging by the first access node in signaling with the second access node to arrange for establishment for the UE of the second connection, and wherein applying the timer for delaying application of the process comprises applying a timer for delaying the engaging in the signaling with the second access node.

18. The first access node of claim 12, further comprising setting a duration for the timer based on the determined level of load of the second access node.

19. The first access node of claim 12, wherein the controller comprises a processing unit, non-transitory data storage, and program instructions stored in the non-transitory data storage and executable by the processing unit to cause the first access node to carry out the operations.

20. A non-transitory computer-readable medium having encoded thereon instructions executable by a processing unit to cause a first access node to carry out operations for controlling configuration of connectivity of a user equipment device (UE) when the UE has a first connection between the UE and the first access node, the operations including:
    determining a level of load of a second access node with which the UE is not currently connected, and
    using the determined level of load of the second access node as a basis to control whether to delay configuration of dual connectivity for the UE in which the UE would be served concurrently by the first access node over the first connection between the UE and the first access node and by the second access node over a second connection between the UE and the second access node,
    wherein using the determined level of load of the second access node as a basis to control whether to delay configuration of the dual connectivity for the UE comprises (i) making a determination whether the determined level of load of the second access node is at least predefined threshold high, (ii) if the determination is that the determined level of load of the second access node is not at least predefined threshold high, then, based at least in part on the determination, proceeding with application of a process for adding the second connection, without applying a timer for delaying application of the process, and (iii) if the determination is that the determined level of load of the second access node is at least predefined threshold high, then, based at least in part on the determination, applying the timer for delaying application of the process and, upon expiration of the timer, proceeding with application of the process.

* * * * *